United States Patent
Jakobsen

(10) Patent No.: US 8,915,480 B2
(45) Date of Patent: Dec. 23, 2014

(54) VALVE ACTUATOR SYSTEM

(75) Inventor: Poul Elholm Jakobsen, Hørsholm (DK)

(73) Assignee: Kmatic Aps, Holstebro (DK)

( * ) Notice: Subject to any disclaimer, the term of this patent is extended or adjusted under 35 U.S.C. 154(b) by 322 days.

(21) Appl. No.: 12/680,662

(22) PCT Filed: Sep. 26, 2008

(86) PCT No.: PCT/DK2008/050233
§ 371 (c)(1),
(2), (4) Date: May 12, 2010

(87) PCT Pub. No.: WO2009/039856
PCT Pub. Date: Apr. 2, 2009

(65) Prior Publication Data
US 2010/0236632 A1    Sep. 23, 2010

(30) Foreign Application Priority Data
Sep. 27, 2007   (DK) .................................. 2007 01389

(51) Int. Cl.
*F16K 31/12* (2006.01)
*F15B 21/06* (2006.01)
*F16K 31/122* (2006.01)

(52) U.S. Cl.
CPC ............. *F16K 31/1221* (2013.01); *F15B 21/06* (2013.01); *F16K 31/122* (2013.01)
USPC ............. 251/30.02; 251/63; 251/368; 91/459

(58) Field of Classification Search
USPC .............. 251/30.01, 30.02, 62, 63, 63.5, 368; 137/237; 91/459
See application file for complete search history.

(56) References Cited

U.S. PATENT DOCUMENTS

| | | | |
|---|---|---|---|
| 4,007,906 A * | 2/1977 | Karpenko | 251/26 |
| 4,230,299 A | 10/1980 | Pierce, Jr. | |
| 4,744,386 A * | 5/1988 | Frazer | 137/315.31 |
| 5,464,191 A | 11/1995 | Shenk | |
| 5,474,107 A * | 12/1995 | Hayes | 137/625.5 |
| 5,549,134 A * | 8/1996 | Browne et al. | 137/606 |
| 5,850,853 A * | 12/1998 | Ohmi et al. | 137/606 |

(Continued)

FOREIGN PATENT DOCUMENTS

| | | |
|---|---|---|
| CN | 2071737 U | 2/1991 |
| DE | 43 97 987 A1 | 9/1994 |

(Continued)

*Primary Examiner* — John K Fristoe, Jr.
*Assistant Examiner* — Reinaldo Sanchez-Medina
(74) *Attorney, Agent, or Firm* — Roberts Mlotkowski Safran & Cole, P.C.; David S. Safran

(57) ABSTRACT

Valve actuator system and a system for operation of valves, which valve comprises a valve housing, which valve housing comprises at least one inlet and at least one outlet, which valve housing further comprises a valve closing element, which valve element is mechanical connected to a valve actuator, which valve actuator comprises at least one piston, which piston is moved in a housing by a pressurized fluid in at least one direction, which valve actuator is connected to a control valve which control valve regulates a flow of a liquid medium from a pressure source to a first cavity chamber in the hosing of the valve actuator where the valve is a sanitary valve primarily for regulation of a flow of Fluid food, which valve actuator is activated by a liquid medium.

11 Claims, 6 Drawing Sheets

(56) References Cited

U.S. PATENT DOCUMENTS

| | | | |
|---|---|---|---|
| 6,113,063 A * | 9/2000 | Takahashi et al. | 251/58 |
| 6,194,012 B1 * | 2/2001 | Palmer | 426/129 |
| 6,655,404 B2 * | 12/2003 | Hilaire | 137/86 |
| 6,684,897 B2 | 2/2004 | Sundararajan | |
| 6,729,601 B2 * | 5/2004 | Freisinger et al. | 251/129.05 |
| 6,742,483 B2 * | 6/2004 | Asakura | 123/90.16 |
| 7,198,058 B2 * | 4/2007 | Burmester | 137/312 |
| 2004/0011192 A1 * | 1/2004 | Frediani et al. | 91/459 |
| 2005/0012058 A1 * | 1/2005 | Medina | 251/31 |
| 2007/0144595 A1 * | 6/2007 | Geva | 137/625.48 |

FOREIGN PATENT DOCUMENTS

| | | |
|---|---|---|
| EP | 0 136 567 A2 | 4/1985 |
| EP | 0 192 973 A1 | 9/1986 |
| EP | 0 756 118 A2 | 1/1997 |
| GB | 2 276 209 A | 9/1994 |
| GB | 2 315 114 A | 1/1998 |
| WO | 2005/098297 A2 | 10/2005 |

* cited by examiner

VALVE ACTUATOR SYSTEM

FIELD OF THE INVENTION

The present invention relates to a valve actuator system, primarily for opening and closing a valve, which valve comprises a valve housing, which valve housing comprises at least one inlet and at least one outlet, which valve housing further comprises a valve closing element, which valve closing element is mechanical connected to a valve actuator, which valve actuator comprises at least one piston, which piston is moved in a housing by a pressurised fluid in at least one direction, which valve actuator is connected to a control valve which control valve regulates a flow of a liquid medium from a pressure source to a first cavity chamber in the hosing of the valve actuator.

Furthermore, the present invention relates to a method for operating a sanitary valve primarily for Fluid food, which valve at least closes or opens for a flow from an inlet towards an outlet, which valve is operated by at least one actuator, which actuator is activated by a pressurised media.

BACKGROUND OF THE INVENTION

U.S. Pat. No. 6,684,897 concerns a sub sea actuator and method that includes all moving components mounted in a compact, concentric configuration. The sub sea actuator is highly reliable and will operate at depth even with zero valve body cavity pressure. A preferably cup-shaped spring pusher is provided in telescoping relationship to the hydraulic chamber. A piston position indicator is provided which is connected externally to the hydraulic piston cylinder to avoid the possibility of hydraulic leaks due to the piston indicator. A manual override may be provided with a manual override indicator. The manual override indicator has a shorter travel length than the manual override operating stem in order to reduce the overall length of the manual override assembly. The driving stem provides a removable connection to the hydraulic piston from the top of the actuator housing and a quick disconnect permits disconnection of the driving stem from the valve stem. In a preferred embodiment, upper and lower t-slot connections are utilized in the driving stem assembly. In a preferred embodiment, two back seat valves are removable secured to the driving stem to engage respective seats and provide additional sealing around the driving stem so as to prevent leakage between the valve chamber and actuator housing chamber. The high tension spring does not need to be removed to perform maintenance and all wear items and seals are readily accessible. Change or replacement of the stem packing is made from the top of the bonnet to avoid disassembling the bonnet to valve body connection. Pre-load bolts are used to adjustably preload the tension in the return spring. The height/weight of the actuator is significantly reduced as compared to prior art sub sea valve actuators.

EP 0 192 973 A1 describes a fail-safe valve actuator that includes a hydraulic piston and cylinder for driving the valve stem and gate member of a gate valve into a first flow control state responsive to sufficient pressure delivered by a fluid or gas supply line. Upon failure or other loss of sufficient control line pressure, a volute spring drives the cylinder, and hence the stem and gate member, axially outward resulting in the valve being moved into a second flow control state.

GB 2 315 114 concerns a valve actuator that includes a hydraulic cylinder and rod mounted on a housing and connected to the valve stem. Two guide rods are disposed between a fixed plate and an interface plate such that a guide plate can move along the rods. Each rod is surrounded by a spring, which has one end abutting the fixed plate while the other end abuts the guide plate to bias the guide plate away from the fixed plate. The guide plate is adapted to transmit movement of the guide plate to the valve stem, movement of the guide plate being transmitted to the valve stem only when the guide plate is moving in a direction away from the fixed plate. Movement of the rod is transmitted to the valve stem only when the rod is moving in a direction toward the cylinder.

EP 0756118 concerns a fluid control system, and its valve assemblies, are used to control the feeding of fluids accurately by operating opening and closing valves promptly and accurately, for the manufacture of semiconductors, magnetic thin films, biotechnical products, and other products. The fluid control system comprises a principal control line (L) and plural branch control lines (L1, L2, . . . ) for feeding plural types of fluid (G1, G2, . . . ) into a processing device (C) coupled to the principal control line, and plural valve assemblies (V) incorporated in the branch control lines (L1, L2, . . . ) for switching the fluids (G1, G2, . . . ) supplied into the processing device (C). Each of the valve assemblies (V) comprises a fluid drive valve (V') having a fluid pressure actuator (1), and an electromagnetic valve (V") integrally attached, in single housing, substantially without hoses, to the fluid drive valve (V') to feed a working fluid (A) into the fluid pressure actuator (1).

EP 0136 567 relates to a seat valve (5) for a tube (1) which on the inner side has a valve seat running inclined to the tube axis, opposite and coaxially to which seat valve there is a tube connection piece (4) for the connection of the seat valve (5). This seat valve (5) contains a valve ram (6) whose projecting end carries a valve plate (7) which abuts directly in its closing direction on the valve seat (3) and in its open position is located opposite the valve seat (3) and separated therefrom. A control chamber in the valve housing (10, 11) is limited on the one hand by the control piston (24), which is connected to the valve ram (6) and can be acted upon by the medium contained in the tube against a restoring spring force. On the other hand, a control opening (14) opens into the valve chamber. The control piston (24) is guided in a cylindrical part (10) of the valve housing. A side of the piston facing the control opening (14) is split into two regions, namely into a starting region (28), which is in open connection with the control opening (14) in the open position, as a somewhat larger surface than the effective compression surface of the valve plate (7) and, when acted on by the medium, raises the control piston (24) from the cylinder cover (13) against the force of the return spring (26), and into a cut-in region (29), which is separated from the control opening (14) when it is in the open position and is likewise acted upon by the cylinder cover (13) after raising of the control piston (24).

U.S. Pat. No. 4,230,299 concerns a pressure balanced gate valve mechanism wherein a closed loop fluid interchange system interconnects the valve actuator stem area of the valve mechanism with the pressure balancing stem area and functions to accomodate volumetric changes to prevent the development of a hydraulic lock that might otherwise prevent or retard opening and closing movement of the valve mechanism. Internal back-face seating arrangements with combination metal-to-metal and elastomeric sealing elements establish seals between the valve stem and bonnet at one gate position and between the pressure balancing stem and valve body structure at the opposite gate position. An externally threaded portion of the valve bonnet is receivable within internally threaded receiver openings of a plurality of different actuator systems, including manual, mechanical, hydraulic and pneumatic actuator systems. The actuator systems are field interchangeable with the valve in service and under pressure. The valve mechanism is capable of being hydraulically energized by portable hydraulic equipment for moving the valve mechanism to a predetermined position in the event the primary drive system should become inoperative for any reason.

WO 2005/098297 concerns a valve, actuator and control system that allows minimizing the size of the actuator and operation of the control system in a manual mode that automatically prevents accidental operation by pipeline pressure is disclosed. The actuator uses gas pressure from the pipeline to power the actuator. In the event gas pressure is unavailable, a pair of manual hand pumps are incorporated to allow operation of the actuator and valve.

OBJECT OF THE INVENTION

It is the object of the invention to achieve actuation of valves by a non compressible media for activation of sanitary valves. A further object of the invention is to reduce the size of actuators for sanitary valves.

DESCRIPTION OF THE INVENTION

The objects can be achieved by a valve actuator system as described in the preamble to claim 1 if the valve is a sanitary valve primarily for regulation of a flow of Fluid Food (dairy, brewery, wine and soft drinks), Fluid Chemicals or Fluid Pharmaceuticals, which valve actuator, is activated by a liquid medium.

By using a liquid medium to activate the actuator the size of the actuator will be greatly reduced in relation to traditional sanitary valve actuators, which use pressurised air. Typical valve actuators operate by pressurised air and have an actuator with a size in diameter, which extend the valve itself and where the actuators are of such a size that the valves have to be placed in some distance in order to provide sufficient room for the valve actuators. The reason why actuators by pressurised air are relatively big is that the pressure in most cases is approximately 10 Bar or below. The liquid media can be of typical hydraulic media and operate at much higher pressure. Typical pressure in hydraulic systems is 200 Bar and can be even higher. By using these extreme high pressures, extremely high forces can be achieved in an actuator. For valve actuators the pressure can be much lower and the valve will still be actuated highly effectively. Using liquid medium also leads to a situation where a return line from the valve actuator is just as necessary as the pressure line leading towards the actuator. The use of pressure line and return line leads to a situation where regulation is possible at the pressure side and the return side. It is also be possible by blocking both lines to lock the valve in a given position where the valve is locked so hard that no pressure fluctuations will be able to move the valve element in any directions. This can be achieved by a relatively simple valve arrangement where, for example, magnetic valves close when the valve has the correct opening/closing position. Thus, the valve element will be totally fixed in that position and liquid media has to be removed through the lines in order to move the valve element. Especially for sanitary valves it is very important that no kind of pollution, such as chemicals or bacteria, is to be found in a factory where the valves operate. This is achieved when working with a liquid medium, as the medium is not in contact with the atmosphere. If by accident, the liquid medium gets into contact with Fluid food, the liquid medium can be kept chemical and neutral and be sterilised in the closed circulating system so that bacteria never will occur in the liquid.

In a preferred embodiment for the invention the liquid medium comprises mostly water. Clean water is a preferred liquid for hydraulics. Water is mainly incompressible in relation to most other liquids and water is the cheapest existing hydraulic media. If by accident drops of water come into contact with Fluid food there is probably no need for destroying the products, as no actual pollution takes place.

The valve actuator can operate linearly in relation to a linear operating valve closing element. When valves are linearly operated it is of course preferred to use a linear actuator placed in relation to the valve. One example is that the actuator is placed above the valve however, the actuator can also be placed below the valve. By using a linear operation it is, for example, possible that a shaft connected to an operational distance between cavities is able to transmit the force directly to a valve closing element. By using as few mechanical elements as possible the most simple and reliable valve will be achieved.

Instead the valve actuator can operate rotationally in relation to a rotationally operating valve closing element. In situations where, for example, butterfly valves are to be actuated these need rotational activation. In this situation, rotational actuators will be the most effective. By means of this, all kind of hydraulic motors can be used. Some hydraulic motors might operate together with a traditional gear mechanism to operate the valve. Thus, very small rotational hydraulic motors can be used for opening extremely big valves if there is no need for fast response. Another possibility is that the actuator itself is linear but the actual movement is transformed from linear movements into rotational movement. This is a well-known technology from valves actuated by pressurised air.

Preferably the pressure of the liquid media is below 50 Bar. The pressure has to be selected in relation to the force that is needed in order to activate a valve. Typical sufficient force is achieved by relative low pressure. A pressure twice the typical pressure of pressurised air will, for example, rapidly reduce the diameter of an actuator. Therefore, typical pressure for valve hydraulics is in the area of 20-30 Bar.

The valve actuator can open the valve when a cavity is pressurised, where opening the valve also can activate a return spring for closing the valve. A typical way for operating valves is to let the hydraulic pressure open the valve and at the same time activate a return spring. If there for some reason is a pressure drop in the hydraulic system, the valve will automatically close. By means of this, a very fail safe valve is achieved, and in worst case scenarios with broken hydraulic lines it will only lead to closing of the valve. Very safe emergency closing systems can also be achieved in this way. By using water as a hydraulic medium, release valves can be used and only open in an emergency situation due to fact that water will not lead to any pollution.

In a preferred embodiment the valve can operate in relation to a first actuator for opening the valve, which valve can operate in relation to a second actuator for closing the valve. In a preferred embodiment of the invention the valve is operated by two actuators. By operating with two actuators, one actuator can perform force in the opening direction, while the other actuator can perform force in the closing direction. This is maybe the preferred embodiment where valves are used for regulation, where a valve closing element has to be placed somewhere between an opening and closing position and where regulation has to be performed.

The valve actuator might comprise a first cavity for closing the valve when pressurised, which valve actuator can comprise a second cavity for closing the valve when pressurised, where a movable piston can be separating the first and second cavity. It is possible to let the valve operate by an actuator, which comprises two working cavities separated by the piston. In this way, the hydraulic pressure can be used for both opening and closing the valve. Especially when operating by using two working cavities it is possible to operate the valve with its own closed hydraulic system. Letting a pump operate in a way so the pump moves the liquid from one cavity to another, will lead to movement of the valve. If the pump is stopped, the pump might close the flow line and the valve as such is blocked in that position. Because the liquid is incompressible no movement of the valve is possible. But as soon as the pump is activated in any direction, the liquid is moved and the valve is moved from one position to another.

The control valve can be electric activated, which control valve has a first position where flow to and from the valve actuator is closed, which control valve has a second position for pressurising the first cavity and reducing the pressure in the second cavity in the valve actuator, which control valve has a third position for pressurising the second cavity and reducing the pressure in the first cavity. If more valves are operating relatively close to each other it is possible to use a centralized pump for activating the valves. By having a pressure line and a return line, the valve regulation can be performed by electromagnetic valves that regulate the hydraulic flow.

Preferably the control valve is electric activated by pulse with modulation. One possible way of operating an electromagnetic valve is by using pulse with modulation. However, many other modulation forms are also well-known and these can also be used.

Further the objects can be achieved by a valve actuator system as described in the preamble to claim 11 if the media is a liquid, which liquid comprises mostly water.

Water as hydraulic media has been well-know for a very long time. Water was in fact used long before anybody started using oil as hydraulic media. The use of water hydraulic for activating sanitary valves are highly effective, as actuators will reduce in size and there will be no pollution in the room generated by the release of pressurised air. In a situation where water from the hydraulic system comes in contact with for example Fluid food, limited harm is generated to the product. However, if it had been hydraulic oil, which had come in contact with the Fluid food, a very high quantity of Fluid food would have to be destroyed due to pollution. In relation to production of drug, days of production might be destroyed. Using clear water solves the problem mainly because a small amount of water added to the product has no negative influence. Of course there are chemical products, which shall get in contact with water. In this case, other hydraulic media has to be used.

It is preferred that water can be used as the form of liquid. In all situations where there are no risk of frost, which means that the production area will not be kept at a temperature below 0, there is a good argument for using absolutely clear water. The clear water is incompressible in relation to other hydraulic media and the clean water is also the cheapest hydraulic media.

In cold areas the liquid can be a mixture of water and an anti freezing agent. In situations where the temperature is below 0, such as for outdoor production systems, the water can comprise an anti-freezing agent at least in the winter period.

DETAILED DESCRIPTION OF THE INVENTION

Figure 1:
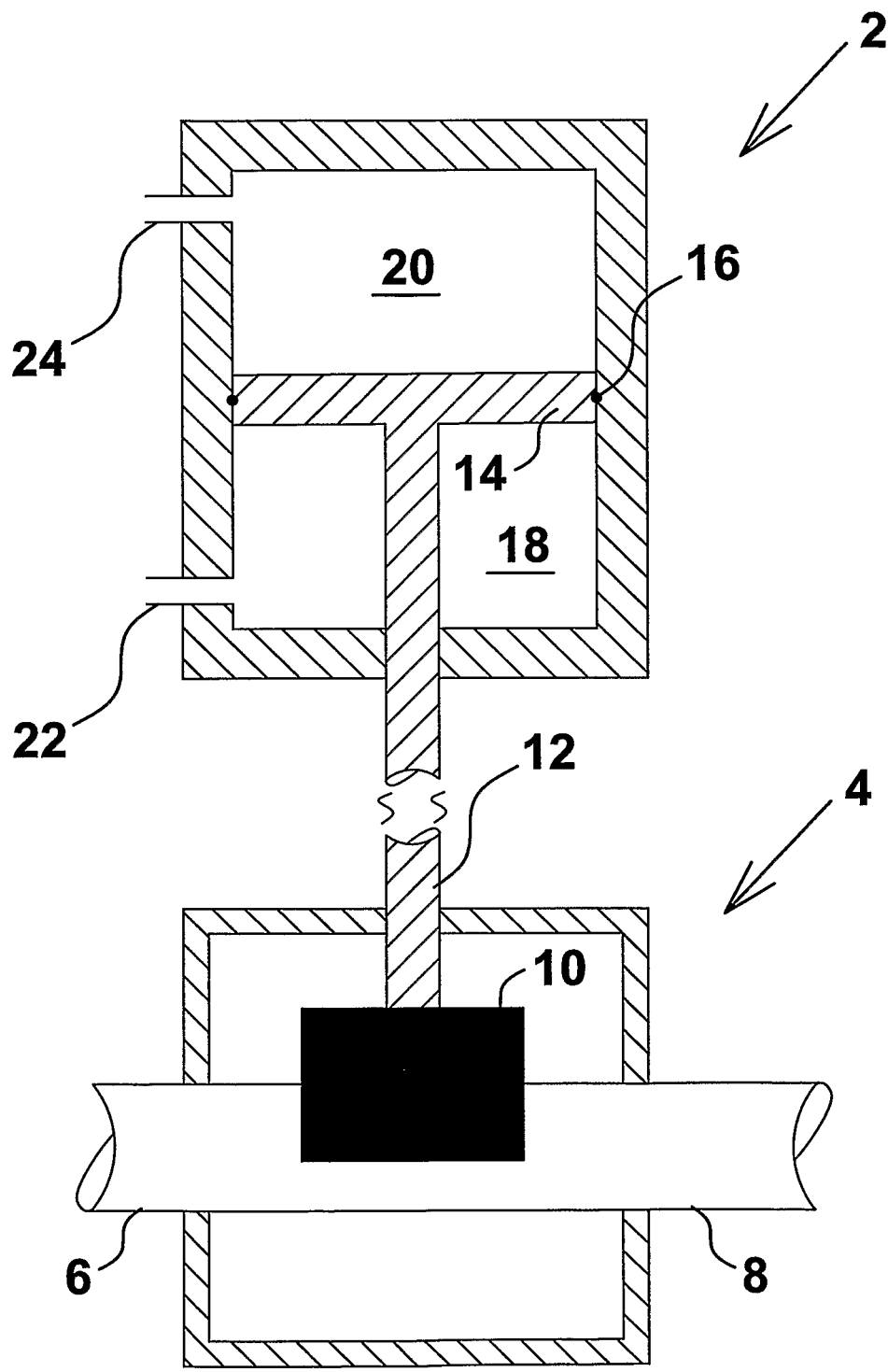
FIG. 1 shows a first possible embodiment of a valve actuator.

FIG. 1 shows a valve actuator housing 2 connected to a valve body 4, which valve body 4 comprises an inlet 6 and an outlet 8. Inside the valve body 4 a valve closing element 10 is shown. This valve element is connected to a shaft 12, which shaft 12 is directly connected to a piston 14, which piston 14 is movable inside the actuator housing 2. A slide ring 16 tightens against the housing 2. Below the piston 14 the cavity 18 is indicated and above this the cavity 20 is indicated. Furthermore, two lines 22 and 24 are shown, which lines are used for changing the pressure in the chambers 18 and 20.

During operation the valve actuator is able to regulate the flow from the inlet to the outlet by the valve closing element 10. Opening of the valve takes place, if the pressure in the cavity 18 increases. If the hydraulic media can leave the cavity through line 24, it is possible to move the piston 14 upwards. If the valve is closed the pressure increases over line 24 in the cavity 20. If this way the flow through line 22 is open this allows the piston to move downwards, and the valve is closed.

Figure 2:
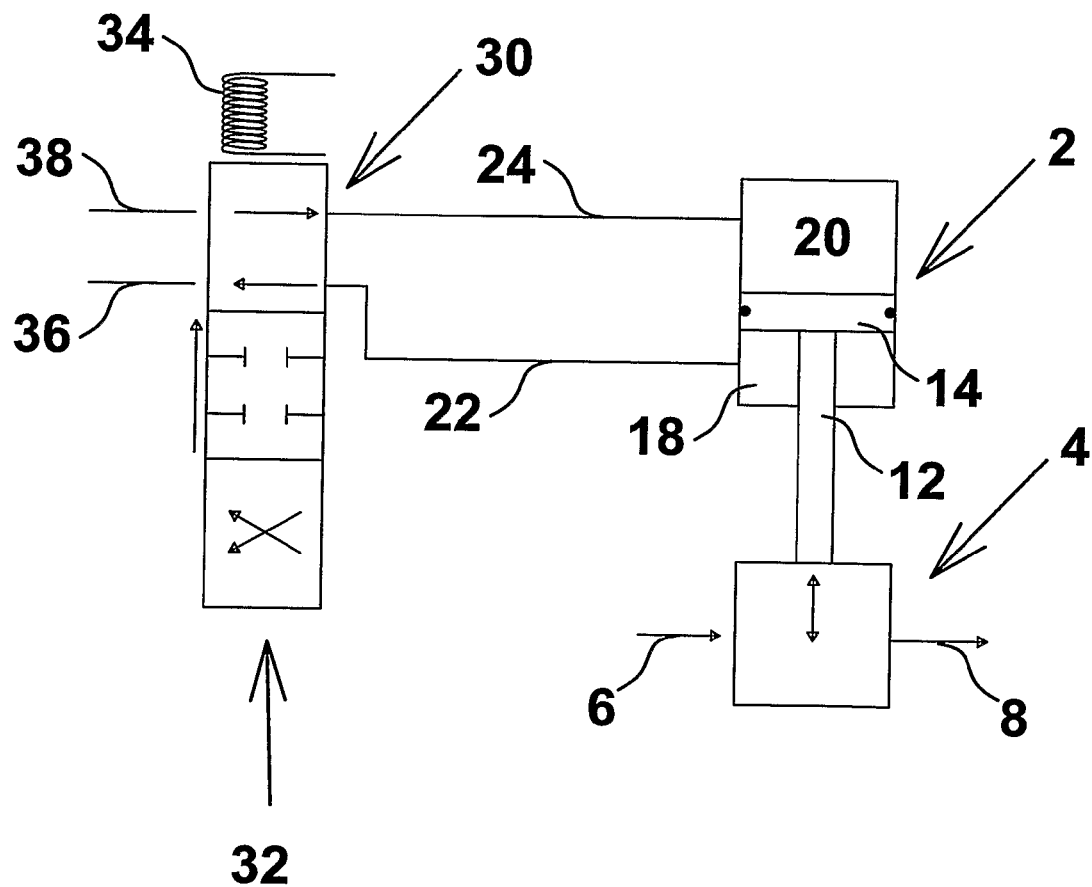
FIG. 2 shows a valve actuator coupled to a magnetic valve.

FIG. 2 shows the same valve actuator as shown in FIG. 1. The actuator housing 2 is connected to the valve body 4, an inlet 6, and an outlet 8. The shaft 12 is connected to the piston 14, which can be moved inside the chamber by changing the pressure in the chambers 18 and 20. The lines 22 and 24 are connected to a hydraulic valve 30. This valve 30 comprises a valve slider 32, which controls the flow through the valve 30. The slider 32 is a possible embodiment connected to a magnetic slider operated by a magnetic coil 34. Furthermore, the hydraulic valve 30 has a pressure inlet 38 and a tank connection 36.

During operation the hydraulic valve 30 regulates the flow in lines 22 and 24. The slider 32 as shown allows positive flow to a cavity 20 and backwards from the cavity 18. This allows the piston 14 to be moved downwards. If the slider 32 is moved to the middle position, there is no flow and the valve is closed. This leads to a blocking of the piston 14 in the actual position. If the piston is relatively tight and separates the cavities 18 and 20, the piston is blocked in its actual position. This means that any pressure fluctuation in the line 6 or 8 is unable to influence the position of the actual valve in the valve housing 4. Moving the slider 32 into its third position results in a positive flow in line 22 which flow increases the pressure in the cavity 18 and reduces the pressure in the chamber 20. This moves the piston 14 upwards, which could lead to an opening of the valve. The slider 32 can in some situations be magnetically activated by the coil 34. In this situation the slider could be moved very fast between the different positions. Depending on the slider 32 the flow regulation could take place in an analogue way where there is an analogue regulation between the positions for flow and the position for closing. This way it is possible to regulate the pressure in the chamber 18 and 20 efficiently. The coil 34 could be connected to computer controlled regulation which can achieve a very precise regulation of the slider 32. The position of the slider 32 could be indicated by indicating means which could send signals back to the computer control.

Figure 3:
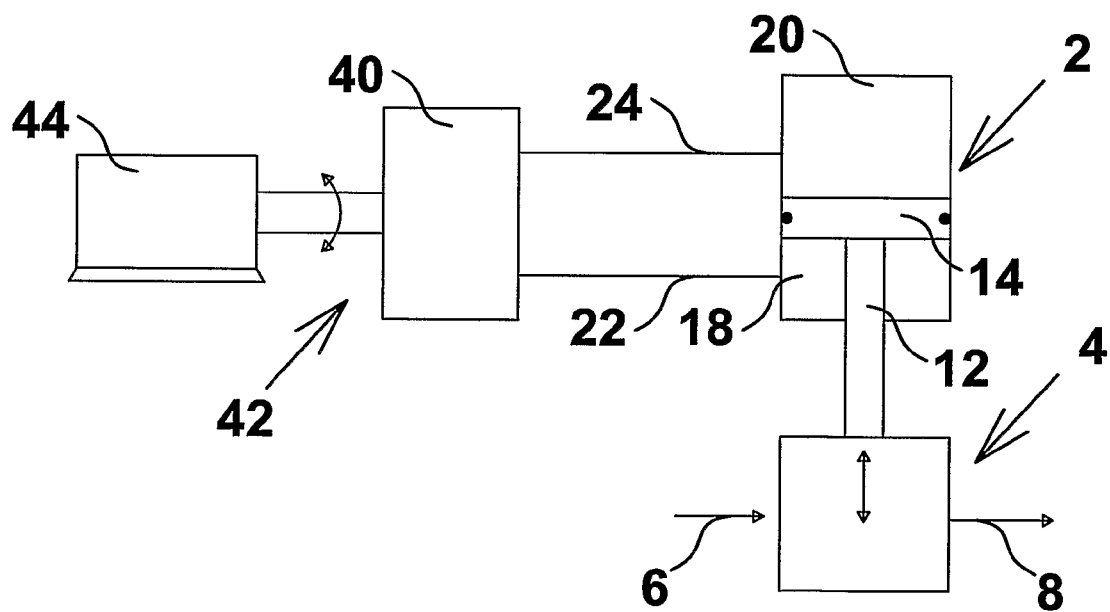
FIG. 3 shows a valve actuator operated by a motorized pump.

FIG. 3 shows a valve actuator housing 2 during operation. The cavity is connected by a line 22 to a pump, where the cavity 20 is connected by line 24 to the pump 40. This pump is by a rotating shaft 42 connected to a motor 44. During operation the pump 40 could be of the gerotor type which is able to move liquid in both directions depending on the direction of the rotation. This way, very small amounts of fluid are moved by line 20 and 24, which slightly changes the pressure in the cavities 18 and 20. The pump 40 and the motor 44 can in fact be part of the same system and be integrated into a common housing, This way it is achieved that an actuator system is achieved, which system can operate as a stand-alone-system with electrical connection to the motor 44, which motor could be any kind of electric motor. This way it is achieved that no pressure or return lines are necessary. Even in situations where many different valves operate very close to each other this method is highly efficient because a high number of valves can operate simultaneously. Especially when dealing with sanitary valves for food or medicine production it is very important that the valves as such operate without connection in the shape of lines. Only electrical supply is necessary.

Figure 4:
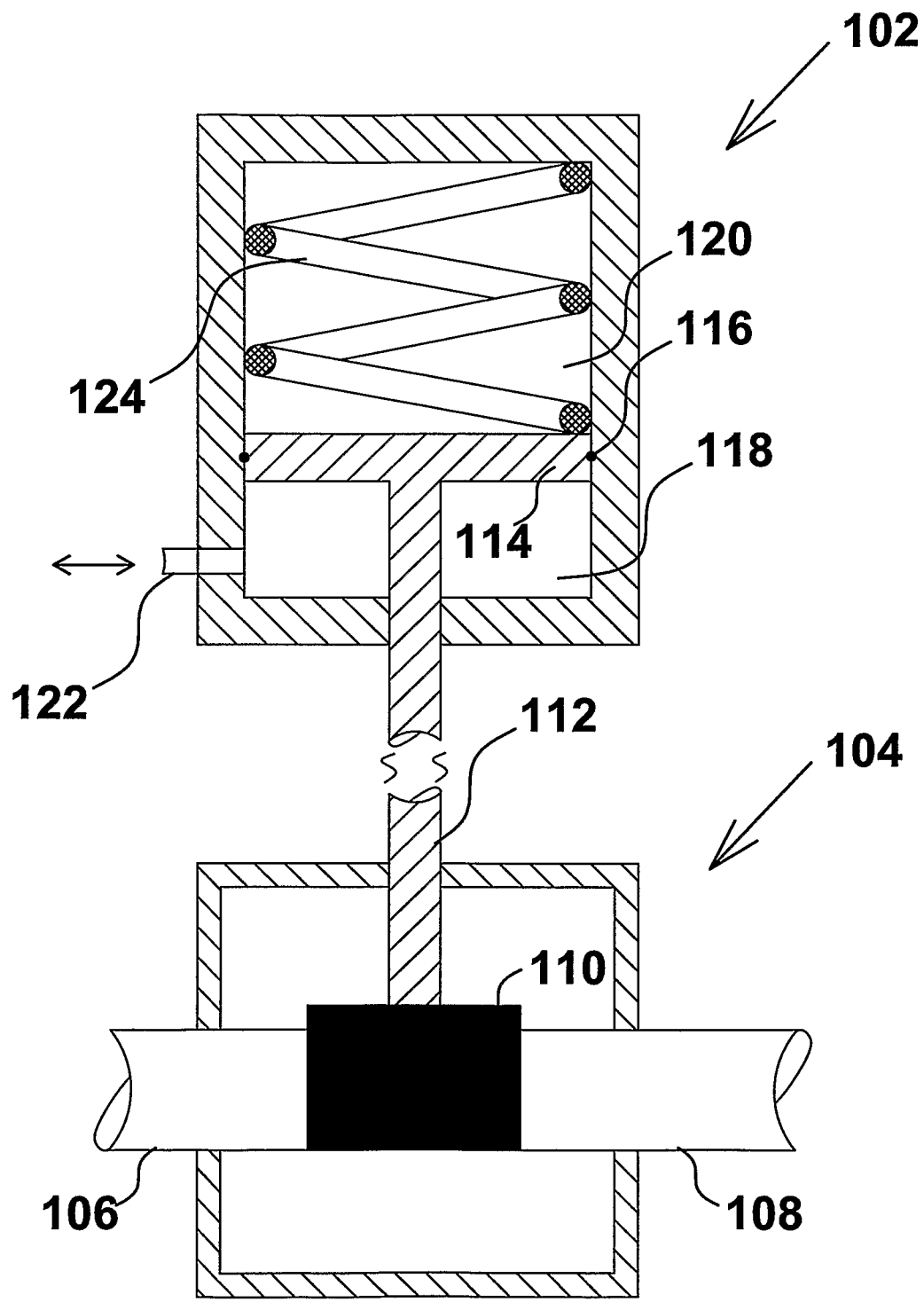
FIG. 4 shows a valve actuator connected to a valve body.

FIG. 4 shows a valve actuator 102 connected to a valve body 104. The valve body 4 comprises an inlet 106 and an outlet 108. The valve body 104 comprises a valve closing element 110. The valve closing element 110 is operated by a shaft 112 which shaft is connected directly or indirectly to a piston 114 which piston 114 is movable inside the actuator housing 102. An O-ring 116 is tied against the housing 102. Below the piston 114 a cavity 118 is shown. A fluid connection 112 is indicated to connect the cavity 118 to a hydraulic liquid. As indicated by the arrow at the fluid connection 122, flow can take place in both directions if connected to a control valve as described in FIG. 2. Above the piston 114, a further cavity 120 is indicated. This cavity comprises a spring 124.

In operation of a valve actuator as indicated in FIG. 4, the spring 124 will force the valve into a closed position. The valve will be opened if fluid is pressed into the cavity 118 and the pressure in the cavity 118 is higher than the forces acting from the spring 124. Then the piston 114 will be moved upwards and the valve element 110 will open for a flow from the inlet 106 to the outlet 108. Under normal working conditions, the position of the valve element 110 can be very precisely regulated by changing the pressure in the chamber 118. In an emergency situation where e.g. there is a power failure, the control valve could be designed to automatically enter into an open position which will reduce the pressure in the chamber 118. The spring 124 will then automatically close the valve by pressing the valve element 110 into its closed position. The valve will then at first be opened if the pressure in the chamber 118 is increased.

Figure 5:
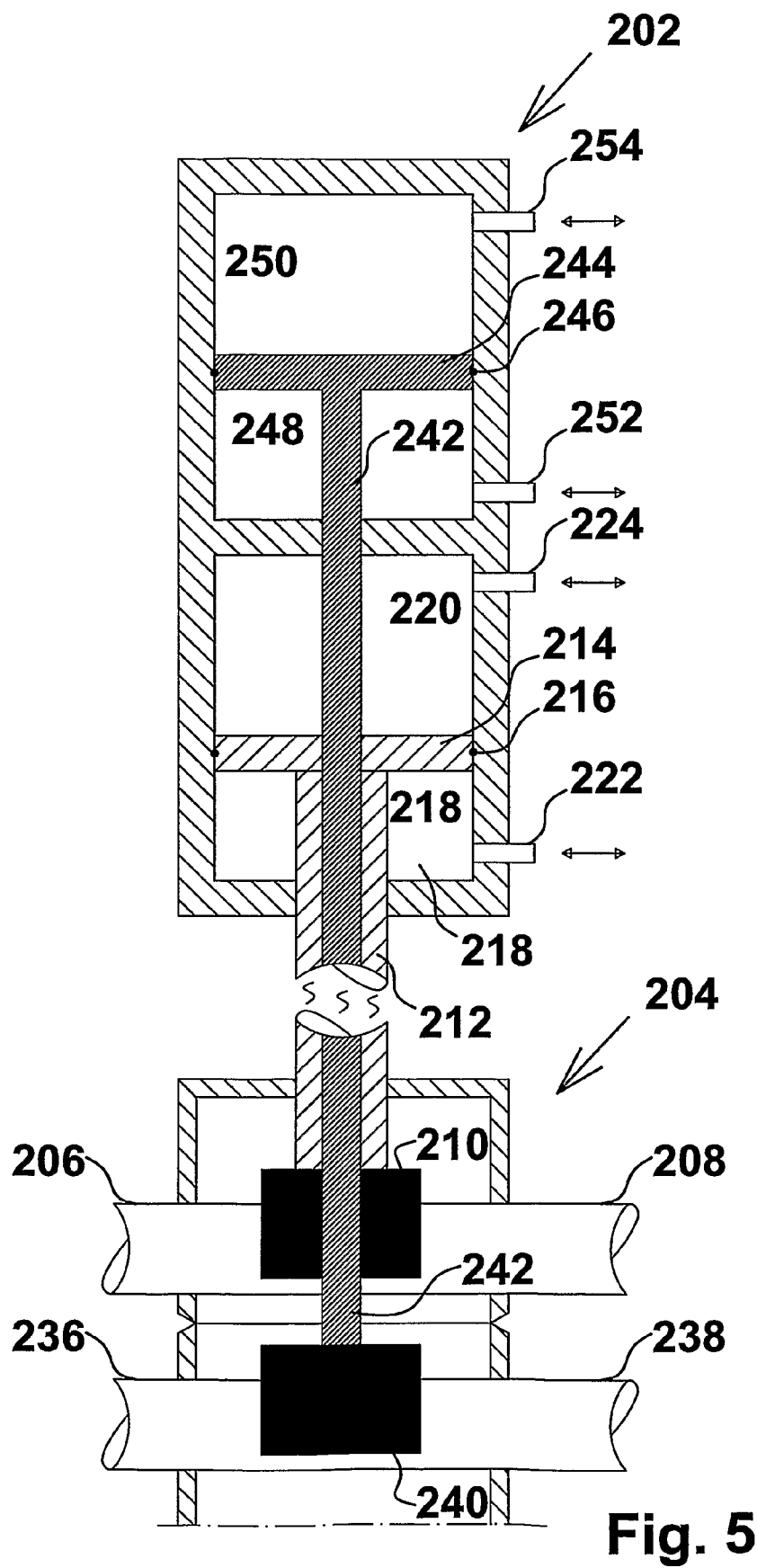
FIG. 5 shows a double acting valve.

FIG. 5 shows a double acting valve. An actuator housing 202 is shown which actuator housing is connected to a valve housing 204. The valve housing 204 has a first inlet 206 and a first outlet 208. The flow between inlet 206 and outlet 208 is controlled by a valve closing element 210. The valve element 210 is connected by means of a hollow shaft 212 which is further connected to a piston 214. This piston 214 is movable in the actuator housing 212 and below the piston 214 is shown a first cavity 218 above the piston 214 is shown further a cavity 220. The lower cavity 218 is connected by means of a fluid connection 222 which is connected to a control valve which is not shown. The cavity 220 is connected by means of a fluid connection 224 also to the control valve shown at FIG. 2.

A further fluid inlet 236 is shown below the figure and a further fluid outlet is shown at 238. A valve closing element is operating in the flow line between inlet 236 and 238. The valve closing element 240 is activated by a shaft 242. This shaft 242 is placed inside the shaft 212. The shaft 242 is directly or indirectly connected to a piston 244 where a cavity 248 is placed below the piston 244 and a cavity 250 is placed above the piston 244. The piston 244 comprises a tightening O-ring 246. The cavity 248 is connected by means of a fluid connection 252 to a control valve as shown at FIG. 2.

Figure 6:
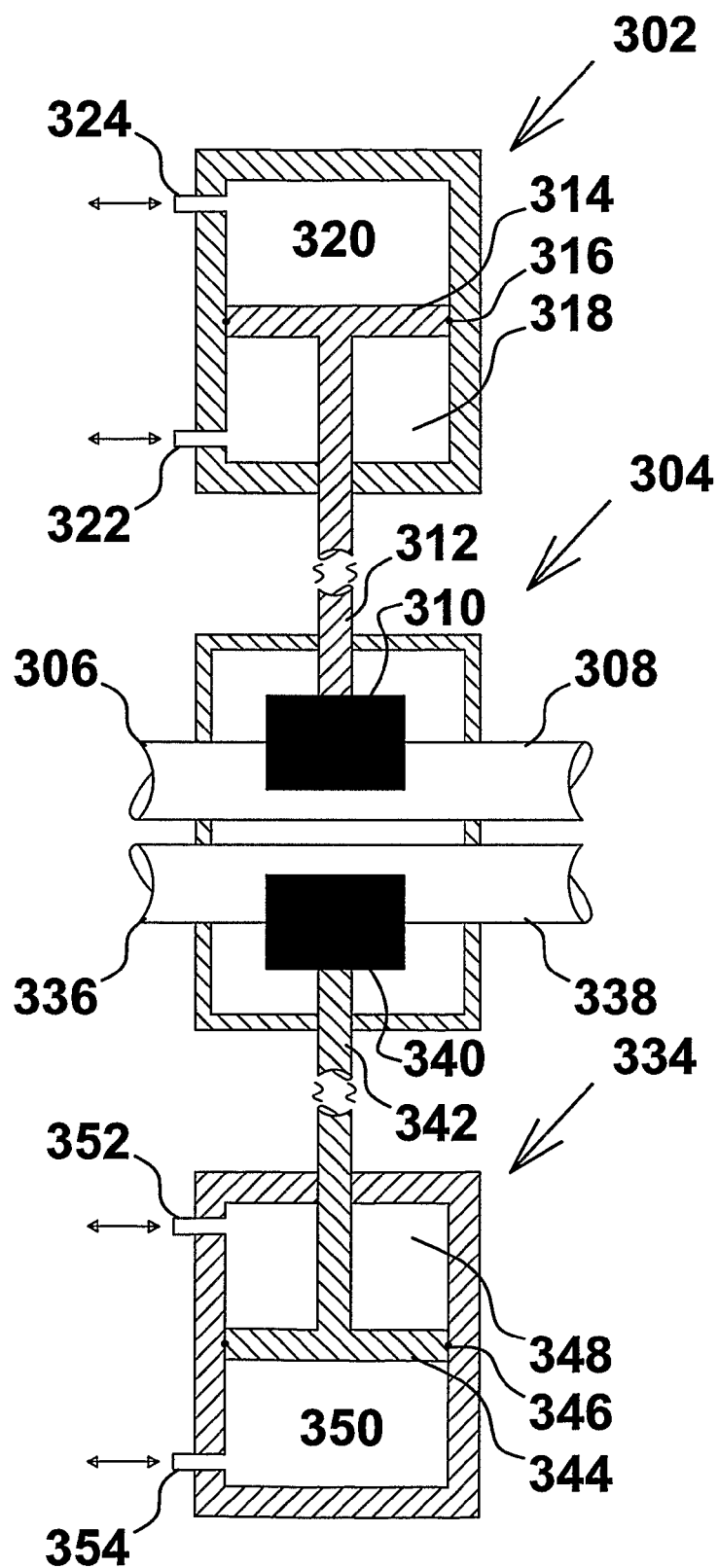
FIG. 6 shows an alternative embodiment to FIG. 5

FIG. 6 shows an alternative embodiment to FIG. 5 in that FIG. 6 also describes a double acting valve, but where the actuators are operating independently in two different actuator housings from each side.

The first actuator 302 is connected to the common valve housing 304. The valve housing 304 comprises a first inlet 306 and a first outlet 308. A valve closing element 310 is regulating the flow between 306 and 308. The valve element 310 is connected directly or indirectly to a shaft 312 to a piston 314. The piston 304 has an O-ring 316 to close against the housing in the valve body 302. A cavity 318 is formed below the piston 314 and a further cavity 320 is formed above the piston 314. The lower cavity 318 is connected by means of a fluid connection 332 to a control valve (not shown). Further, the cavity 320 is connected by means of a fluid connection 324.

The figure further shows the second actuator housing 334 which is operation a closing element 340 which is placed between an inlet 336 and an outlet 338 of a second fluid line. The valve closing element 340 is connected by means of a shaft 342 to a piston 344. This piston 344 comprises an O-ring 346. A cavity has been placed above the piston and a cavity 350 is shown below the piston 344. The upper cavity 348 is connected by means of a fluid connection 352 to a control valve as shown at the FIG. 2. The cavity 350 is connected to a fluid connection 354.

The invention claimed is:

1. Valve actuator system, comprising:
a valve that has a valve housing at least one inlet, at least one outlet, a valve regulating element for controlling flow through the valve and that is mechanical connected to a valve actuator having at least one piston that is movable in a housing by a pressurized liquid medium in at least one direction and that is connected to the valve regulation element, the housing of the valve actuator comprising a first cavity chamber and a second cavity chamber which are separated by said at least one movable piston, which first and second chambers are connected through connecting lines and a valve arrangement to a pressure line and to a return line, the pressure line being connected to a pump, the return line being connected to a tank, and the pressurized liquid medium being a primarily incompressible medium comprised primarily of water,
wherein the valve arrangement has a magnetic coil and a slider that is movable by the magnetic coil,
wherein the at least one piston is lockable in the housing by blocking connection of the connecting lines to the pressure line and the return line by movement of the slider of the valve arrangement by said magnetic coil, whereby the piston and the valve regulating element are locked in a given position that prevents pressure fluctuations in a drug or food in said flow from moving the valve regulation element and the piston in any direction as a result of the pressurized liquid in the blocked connecting lines being essentially incompressible, and wherein the valve is a hygienic sanitary valve connected in a flow of fluid food or drug for regulating of said flow, at least surfaces of the valve in contact with the food or drug being formed of a hygienic material, which material prevents growth of bacteria or fungus.

2. Valve actuator system according to claim 1, whereby the valve actuator is movable linearly in relation to a linear operating valve closing element.

3. Valve actuator system according to claim 1, whereby the valve actuator is movable in relation to a rotationally operating valve closing element.

4. Valve actuator system according to claim 1, whereby the pressure of the liquid media is mostly below 50 Bar.

5. Valve actuator system according to the claim 4, whereby the valve actuator is adapted to open the valve when the pressurized liquid flows into the first cavity chamber, where opening the valve also activates a return spring for closing the valve when the amount of pressurized liquid in the first cavity chamber is reduced.

6. Valve actuator system according to the claim 4, wherein at least a first actuator is adapted to perform regulation of a first valve closing element in the valve, wherein at least a second actuator is adapted to perform regulation of a second valve closing element in the valve.

7. Valve actuator system according to the claim 4, whereby the valve actuator comprises the first cavity chamber for closing the valve when a pressurised liquid is supplied to the first cavity chamber, and the second cavity chamber for opening the valve when a pressurised liquid is supplied to the second cavity chamber, and where said at least one movable piston separates the first and second cavity chamber.

8. Valve actuator system according to the claim 7, whereby the magnetic coil is electrically activated for moving the slider between a first position where flow to and from the valve actuator is closed, a second position for pressurising the first cavity chamber and reducing the pressure in the second cavity in the valve actuator, and a third position for pressurising the second cavity and reducing the pressure in the first cavity chamber.

9. Valve actuator system according to the claim 8, whereby the magnetic coil is electrically activated by pulse-width modulation.

10. Valve actuator system according to the claim 7, wherein the valve actuator piston is lockable by discontinuing the flow of pressurised liquid into and out of the first and second chambers.

11. Method for operating a sanitary valve positioned in a flow of drug or food, which valve at least performs regulation of the flow from an inlet to an outlet of the valve by a valve regulating element,
  which valve regulating element is operated by at least one actuator, which actuator comprises a first and a second chamber, which chambers are separated by a valve actuator piston,
  which valve actuating piston is activated by a pressurized liquid supplied from a pressure source into the first and second chambers, via liquid lines and valve arrangement having a magnetic coil and a slider that is movable by the magnetic coil,
  wherein pressure in the first and second chambers is regulated through the valve arrangement regulating the flow from a pressure line and to a return line, which pressure line is connected to a pump, and which return line is connected to a tank,
  wherein the pressurized liquid is an essentially incompressible liquid comprising mostly water,
  wherein the method comprises the step operating the magnetic coil so as to move the slider into a position blocking the liquid lines towards the first and second chambers at both sides of the piston in order to lock the position of the piston and the valve regulating element,
  wherein the valve regulating element is locked in a manner which prevents pressure fluctuations in the drug or food from influencing the position of the valve regulating element as a result of the pressurized liquid in the blocked liquid lines being essentially incompressible, and
  wherein at least surfaces of the valve in contact with food or drug in said flow being formed of a hygienic material that prevents growth of bacteria or fungus inside the valve.

* * * * *